(12) United States Patent
Jung et al.

(10) Patent No.: US 12,699,903 B2
(45) Date of Patent: Aug. 4, 2026

(54) NEURAL NETWORK BASED TRAINING METHOD, INFERENCE METHOD AND APPARATUS

(71) Applicants: Samsung Electronics Co., Ltd., Suwon-si (KR); Korea Advanced Institute of Science and Technology, Daejeon (KR)

(72) Inventors: Sangil Jung, Yongin-si (KR); Sung Ju Hwang, Daejeon (KR); Changin Choi, Suwon-si (KR); Changyong Son, Anyang-si (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 1441 days.

(21) Appl. No.: 17/328,124

(22) Filed: May 24, 2021

(65) Prior Publication Data

US 2021/0365792 A1    Nov. 25, 2021

Related U.S. Application Data

(60) Provisional application No. 63/028,686, filed on May 22, 2020.

(30) Foreign Application Priority Data

Aug. 25, 2020    (KR) ........................ 10-2020-0106961

(51) Int. Cl.
*G06N 3/0495*    (2023.01)
*G06N 3/084*    (2023.01)
(Continued)

(52) U.S. Cl.
CPC ........... *G06N 3/084* (2013.01); *G06N 3/0495* (2023.01); *G06N 3/10* (2013.01); *G06N 5/04* (2013.01); *G06N 10/60* (2022.01)

(58) Field of Classification Search
CPC ........... G06N 3/084; G06N 3/10; G06N 5/04; G06N 10/60; G06N 3/063; G06N 3/04
See application file for complete search history.

(56) References Cited

U.S. PATENT DOCUMENTS 9,916,531 B1    3/2018 Zivkovic et al.
10,262,259 B2    4/2019 Lin et al.
(Continued)

FOREIGN PATENT DOCUMENTS

KR    10-2018-0043172 A    4/2018
KR    10-2019-0130443 A    11/2019
(Continued)

OTHER PUBLICATIONS

Cai et al "ZeroQ: A Novel Zero Shot Quantization Framework", dated Jan. 1, 2020 and retrieved from https://arxiv.org/abs/2001.00281v1. (Year: 2020).*
(Continued)

*Primary Examiner* — Sanchita Roy
(74) *Attorney, Agent, or Firm* — NSIP Law

(57) ABSTRACT

Disclosed are a neural network-based training method, inference method and apparatus. The neural network-based inference method includes receiving a quantization level for quantizing a weight of a neural network and an activation value that is processed by the neural network, receiving a weight quantized based on the quantization level, generating a quantized activation value by quantizing the activation value based on the quantization level, and performing inference based on the quantized weight and the quantized activation value.

18 Claims, 9 Drawing Sheets

(51) Int. Cl.
    *G06N 3/10*        (2006.01)
    *G06N 5/04*        (2023.01)
    *G06N 10/60*     (2022.01)

(56)            References Cited

U.S. PATENT DOCUMENTS

| | | | |
|---|---|---|---|
| 10,417,525 | B2 | 9/2019 | Ji et al. |
| 2016/0026912 | A1 | 1/2016 | Falcon et al. |
| 2017/0270408 | A1 | 9/2017 | Shi et al. |
| 2019/0347550 | A1 | 11/2019 | Jung et al. |
| 2020/0134461 | A1 | 4/2020 | Chai et al. |
| 2021/0081785 | A1* | 3/2021 | Sakai ...................... G06N 3/045 |
| 2021/0334622 | A1* | 10/2021 | Tao ......................... G06N 3/045 |
| 2024/0062054 | A1* | 2/2024 | Duong .................... G06F 17/16 |

FOREIGN PATENT DOCUMENTS

| | | | |
|---|---|---|---|
| KR | 10-2020-0026455 | A | 3/2020 |
| WO | WO 2007/056803 | A1 | 5/2007 |

OTHER PUBLICATIONS

Zhao et al "Improving Neural Network Quantization without Retraining using Outlier Channel Splitting" published May 2019 and retrieved from arXiv:1901.09504v3 (Year: 2019).*

"Per-Filter/Per-Channel Network Quantization with Mixed Precision", *34th Conference on Neural Information Processing Systems* (*NeurIPS2020*), Online Conference, Canada, Jun. 12, 2020 (pp. 1-8).

Cai, Yaohui, et al., "ZeroQ: A Novel Zero Shot Quantization Framework," *Proceedings of the IEEE/CVF Conference on Computer Vision and Pattern Recognition.,* 2020 (pp. 1-10).

De Prado, Miguel, et al. "QUENN: Quantization engine for low-power neural networks." Proceedings of the 15th ACM International Conference on Computing Frontiers, arXiv:1811.05896v1 [cs.NE], Nov. 14, 2018. (pp. 1-9).

Korean Office Action issued on Apr. 16, 2026, in counterpart Korean Patent Application No. 10-2020-0106961 (2 pages in English, 6 pages in Korean).

\* cited by examiner

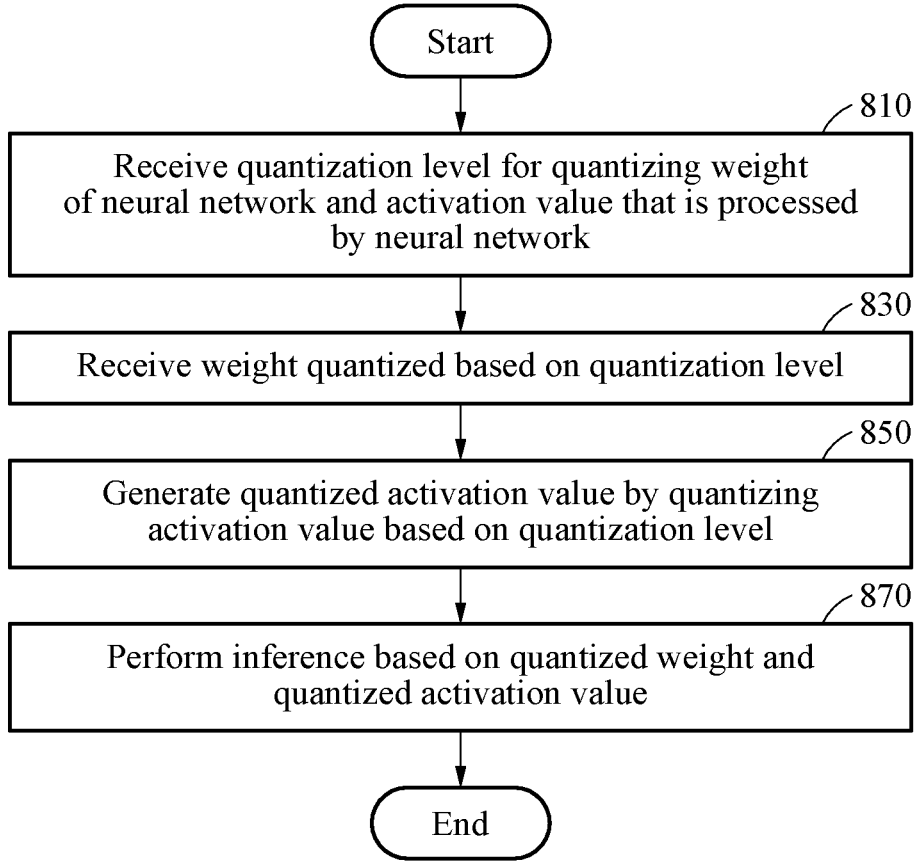

Start

810
Receive quantization level for quantizing weight
of neural network and activation value that is processed
by neural network 830
Receive weight quantized based on quantization level 850
Generate quantized activation value by quantizing
activation value based on quantization level 870
Perform inference based on quantized weight and
quantized activation value End

FIG. 8

NEURAL NETWORK BASED TRAINING METHOD, INFERENCE METHOD AND APPARATUS

CROSS-REFERENCE TO RELATED APPLICATIONS

This application claims the benefit under 35 U.S.C. § 119(e) of U.S. Provisional Application No. 63/028,686 filed on May 22, 2020, in the U.S. Patent and Trademark Office, and claims the benefit under 35 USC § 119(a) of Korean Patent Application No. 10-2020-0106961 filed on Aug. 25, 2020, in the Korean Intellectual Property Office, the entire disclosures, all of which, are incorporated herein by reference for all purposes.

BACKGROUND

1. Field

The following description relates to a neural network-based inference method and apparatus.

2. Description of Related Art

To drive a deep neural network in a device having limited resources, such as a smart phone, low latency and low memory usage is needed. Quantization for a weight or activation of a neural network may be advantageous in computational efficiency or memory usage. However, extreme quantization of a neural network may lead to limited representation power causing degradation of accuracy.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a neural network-based inference method, including receiving a quantization level for quantizing a weight of a neural network and an activation value that is processed by the neural network, receiving a weight quantized based on the quantization level, generating a quantized activation value by quantizing the activation value based on the quantization level, and performing inference based on the quantized weight and the quantized activation value.

The performing of the inference may include obtaining split activation values by splitting the quantized activation value based on the quantization level, and performing the inference based on the quantized weight and the split activation values.

The obtaining of the split activation values may include obtaining the split activation values by splitting the quantized activation value based on a ratio of a first quantization level included in the quantization level and a second quantization level included in the quantization level.

The obtaining of the split activation values by splitting the quantized activation value based on the ratio of the first quantization level and the second quantization level may include splitting the quantized activation value into a number of activation values corresponding to the ratio.

The ratio may be an integer.

The quantized weight may include weights split based on the quantization level, and the performing may include obtaining channels by performing an operation based on the split weights and the quantized activation value, and performing the inference by merging the channels.

In another general aspect, there is provided a neural network-based inference apparatus, including a receiver configured to receive a quantization level for quantizing a weight of a neural network and an activation value that is processed by the neural network, and to receive a weight quantized based on the quantization level, and a processor configured to generate a quantized activation value by quantizing the activation value based on the quantization level, and to perform inference based on the quantized weight and the quantized activation value.

The processor may be configured to obtain split activation values by splitting the quantized activation value based on the quantization level, and to perform the inference based on the quantized weight and the split activation values.

The processor may be configured to obtain the split activation values by splitting the quantized activation value based on a ratio of a first quantization level included in the quantization level and a second quantization level included in the quantization level.

The processor may be configured to obtain the split the quantized activation value into a number of activation values corresponding to the ratio.

The ratio may be an integer.

The quantized weight may include weights split based on the quantization level, and the processor may be configured to obtain channels by performing an operation based on the split weights and the quantized activation value, and to perform the inference by merging the channels.

In another general aspect, there is provided a neural network-based training method, including quantizing a weight of a neural network and an activation value that is processed by the neural network based on a first quantization level and a second quantization level, generating a first channel by performing an operation included in the neural network based on a first quantized weight and a first quantized activation value, generating a second channel by performing an operation included in the neural network based on a second quantized weight and the first quantized activation value, and selecting one of the first channel and the second channel based on a channel selection mask.

The neural network-based training method may include determining the first quantization level and the second quantization level based on a loss of the neural network.

The determining may include determining the first quantization level based on the loss, and determining the second quantization level based on the first quantization level.

The determining of the second quantization level based on the first quantization level may include determining the first quantization level to be an integer multiple of the second quantization level.

The selecting may include generating the channel selection mask, and selecting one of the first channel and the second channel based on the channel selection mask.

The generating of the channel selection mask may include generating the channel selection mask based on a deviation between a first output of the neural network based on the first quantization level and a second output of the neural network based on the second quantization level.

The generating of the channel selection mask may include generating the channel selection mask based on a sensitivity indicating a loss of the neural network for a deviation between a weight based on the first quantization level and a weight based on the second quantization level, or generating the channel selection mask based on a sensitivity indicating a loss of the neural network for a deviation between an activation value based on the first quantization level and an activation value based on the second quantization level.

The generating of the channel selection mask may include training the channel selection mask based on the loss of the neural network.

Other features and aspects will be apparent from the following detailed description, the drawings, and the claims.

BRIEF DESCRIPTION OF THE DRAWINGS

FIG. 8 illustrates an example of an operation of the neural network-based inference apparatus of FIG. 1.

Figure 1:
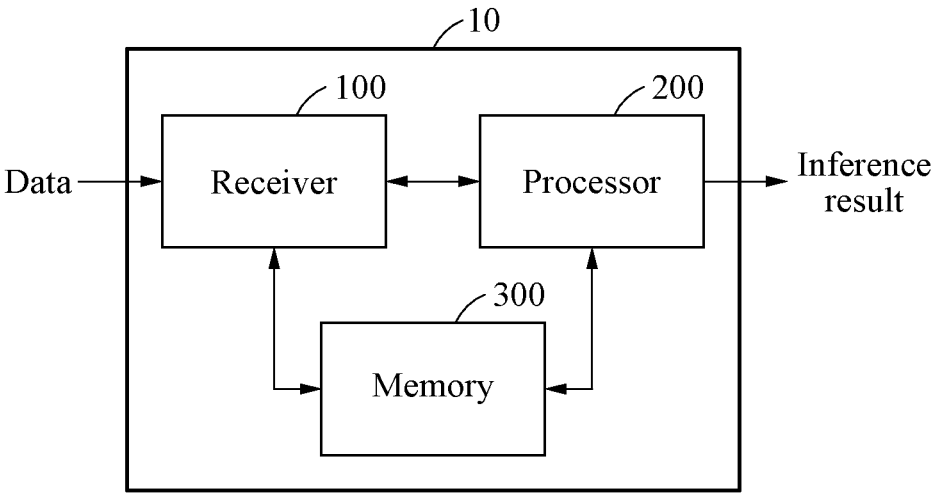
FIG. 1 illustrates an example of a neural network-based inference apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only and is not to be limiting of the examples. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements. However, if the specification states that a first component is "directly connected" or "directly joined" to a second component, a third component may not be "connected" or "joined" between the first component and the second component. Similar expressions, for example, "between" and "immediately between" and "adjacent to" and "immediately adjacent to," are also to be construed in this manner.

The same name may be used to describe an element included in the examples described above and an element having a common function. Unless otherwise mentioned, the descriptions on the examples may be applicable to the following examples and thus, duplicated descriptions will be omitted for conciseness.

FIG. 1 illustrates an example of a neural network-based inference apparatus.

Referring to FIG. 1, a neural network-based inference apparatus 10 may receive data and perform inference on a task. The neural network-based inference apparatus 10 may perform the inference on the task using a neural network. In addition, the neural network-based inference apparatus 10 may perform an operation involved in the neural network.

The neural network or an artificial neural network (ANN) may generate mapping between input patterns and output patterns, and may have a generalization capability to generate a relatively correct output with respect to an input pattern that has not been used for training. The neural network may refer to a general model that has an ability to solve a problem, where nodes form the network through synaptic combinations change a connection strength of synapses through training.

The neural network may be a model with a machine learning structure designed to extract feature data from input data and provide an inference operation based on the feature data. The feature data may be data associated with a feature obtained by abstracting input data. If input data is an image, feature data may be data obtained by abstracting the image and may be represented in a form of, for example, a vector.

The neural network may include a deep neural network (DNN) including a plurality of layers and may be simply referred to as a neural network. The plurality of layers may include an input layer, hidden layers, and an output layer. The neural network may include any one or any combination of a convolutional neural network (CNN), a recurrent neural network (RNN), a perceptron, a feed forward (FF), a radial basis network (RBF), a deep feed forward (DFF), a long short-term memory (LSTM), a gated recurrent unit (GRU), an auto encoder (AE), a variational auto encoder (VAE), a denoising auto encoder (DAE), a sparse auto encoder (SAE), a Markov chain (MC), a Hopfield network (HN), a Boltzmann machine (BM), a restricted Boltzmann machine (RBM), a deep belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differentiable neural computer (DNC), a neural turning machine (NTM), a capsule network (CN), a Kohonen network (KN), and an attention network (AN). In an example, at least a portion of the plurality of layers in the neural network may correspond to the CNN, and another portion thereof may correspond to the FCN. In this case, the CNN may be referred to as convolutional layers, and the FCN may be referred to as fully connected layers.

The neural network-based inference apparatus 10 may train the neural network. The neural network-based inference apparatus 10 may perform the inference on the task using the neural network. The neural network-based inference apparatus 10 may quantize a portion or entirety of the neural network, thereby minimizing degradation of the performance of the neural network while reducing the usage of a memory 300.

The neural network-based inference apparatus 10 may determine a quantization level for quantization. For example, the neural network-based inference apparatus 10 may determine the quantization level using training.

The neural network-based inference apparatus 10 may perform inference through the neural network of which a portion or entirety is quantized based on the determined quantization level.

The neural network-based inference apparatus 10 may quantize the portion or entirety of the neural network using one or more quantization levels. For example, the neural network-based inference apparatus 10 may quantize a weight or an activation value of the neural network. The activation value may include channels.

The quantization may be the process of converting data having consecutive values into discrete values. The quantization level may refer to the step or number of discrete values.

The weight of the neural network may include a filter parameter used for an operation of the neural network. The activation value of the neural network may include data on which the operation included in the neural network is to be performed. For example, the activation value may include a feature map.

The neural network-based inference apparatus 10 includes a receiver 100 and a processor 200. The neural network-based inference apparatus 10 may further include the memory 300.

The receiver 100 may include a reception interface. The receiver 100 may receive data from the processor 200 or the memory 300, and also receive data from the outside of the neural network-based inference apparatus 10.

The receiver 100 may receive data to be processed using the neural network. The receiver 100 may receive at least one quantization level for quantizing the weight of the neural network or the activation value that is processed by the neural network.

The receiver 100 may receive a weight quantized based on the at least one quantization level. The quantized weight received by the receiver 100 may include weights split based on the quantization level. The receiver 100 may output the received quantization level and the quantized weight to the processor 200. The processor 200 may process data stored in the memory 300. The processor 200 may execute a computer-readable code (for example, software) stored in the memory 300 and instructions triggered by the processor 200.

The processor 200 may be a data processing device implemented by hardware including a circuit having a physical structure to perform desired operations. For example, the desired operations may include code or instructions included in a program.

The hardware-implemented generation apparatus may include, for example, a microprocessor, a central processing unit (CPU), single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, a processor core, a multi-core processor, and a multiprocessor, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner. Further description of the processor 200 is given below.

The processor 200 may perform inference based on the learned quantization level, the quantized weight, and the quantized activation value. The processor 200 may generate the quantized activation value by quantizing the activation value based on the quantization level.

The processor 200 may obtain the split activation values by splitting the quantized activation value based on the quantization level, and perform inference based on the quantized weight and the split activation values.

In an example, the processor 200 may obtain the split activation values by splitting the quantized activation value based on a ratio of a first quantization level included in the quantization level and a second quantization level included in the quantization level.

In an example, the processor 200 may obtain the split activation values by splitting the quantized activation value into activation values the number of which corresponds to the ratio. For example, the ratio of the first quantization level and the second quantization level may be an integer.

The processor 200 may perform inference based on the quantized weight and the quantized activation value. The processor 200 may obtain channels by performing an operation based on the split weights and the quantized activation value. The processor 200 may perform inference by merging the obtained channels.

The processor 200 may train the neural network. In an example, the training of the neural network may include the process of determining the quantization level, quantizing the weight, and splitting the weight.

The processor 200 may determine the quantization level and quantize the weight and the activation value based on the determined quantization level. Further, the processor 200 may update the weight by training the neural network based on the quantization level.

The processor 200 may obtain the split weights by splitting the quantized weight into weights the number of which corresponds to the ratio, or obtain the split activation values by splitting the quantized activation value into activation values the number of which corresponds to the ratio. In this example, the ratio may be an integer.

The processor 200 may generate copied weights by copying the quantized weight or the split weights. The processor 200 may perform inference by performing an operation based on the copied weights and the split activation values.

The processor 200 may quantize the weight of the neural network and the activation value that is processed by the neural network based on the first quantization level and the second quantization level.

The processor 200 may generate a first channel by performing an operation included in the neural network based on a first quantized weight and a first quantized activation value. The processor 200 may generate a second channel by performing an operation included in the neural network based on a second quantized weight and the first quantized activation value. Here, a channel may refer to two-dimensional data constituting an activation value.

The operation included in the neural network may include a convolution operation. In other words, the processor 200 may generate the first channel by performing a convolution operation on the first quantized weight and the first quantized activation value. The processor 200 may generate the second channel by performing a convolution operation on the second quantized weight and the first quantized activation value.

The processor 200 may select one of the first channel and the second channel based on a channel selection mask. The processor 200 may generate the channel selection mask. The process of generating the channel selection mask will be described in detail with reference to FIG. 3.

The processor 200 may select one of the first channel and the second channel based on the channel selection mask. The processor 200 may generate the channel selection mask, and select one of the first channel and the second channel based on the channel selection mask.

The processor 200 may generate the channel selection mask based on a deviation between a first output of the neural network based on the first quantization level and a second output of the neural network based on the second quantization level.

The processor 200 may generate the channel selection mask based on a sensitivity indicating a loss of the neural network for a deviation between a weight based on the first quantization level and a weight based on the second quantization level.

The processor 200 may generate the channel selection mask based on a sensitivity indicating a loss of the neural network for a deviation between an activation value based on the first quantization level and an activation value based on the second quantization level.

Further, the processor 200 may train the channel selection mask based on the loss of the neural network. The generation and training of the channel selection mask will be described in detail with reference to FIG. 3.

The processor 200 may determine a quantization level for a channel generated using the channel selection mask, thereby effectively quantizing the weight or the activation value.

The processor 200 may determine the first quantization level and the second quantization level based on the loss of the neural network. The processor 200 may determine the first quantization level based on the loss of the neural network, and determine the second quantization level based on the first quantization level. For example, the processor 200 may determine the first quantization level to be an integer multiple of the second quantization level.

The memory 300 may store instructions (or programs) executable by the processor. For example, the instructions may include instructions to perform an operation of the processor and/or an operation of each element of the processor.

The memory 300 is implemented as a volatile memory device or a non-volatile memory device.

The volatile memory device may be implemented as a dynamic random access memory (DRAM), a static random access memory (SRAM), a thyristor RAM (T-RAM), a zero capacitor RAM (Z-RAM), or a Twin Transistor RAM (TTRAM).

The non-volatile memory device may be implemented as an electrically erasable programmable read-only memory (EEPROM), a flash memory, a magnetic RAM (MRAM), a spin-transfer torque (STT)-MRAM, a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate Memory (NFGM), a holographic memory, a molecular electronic memory device), or an insulator resistance change memory. Further description of the memory 300 is given below.

Figure 2:
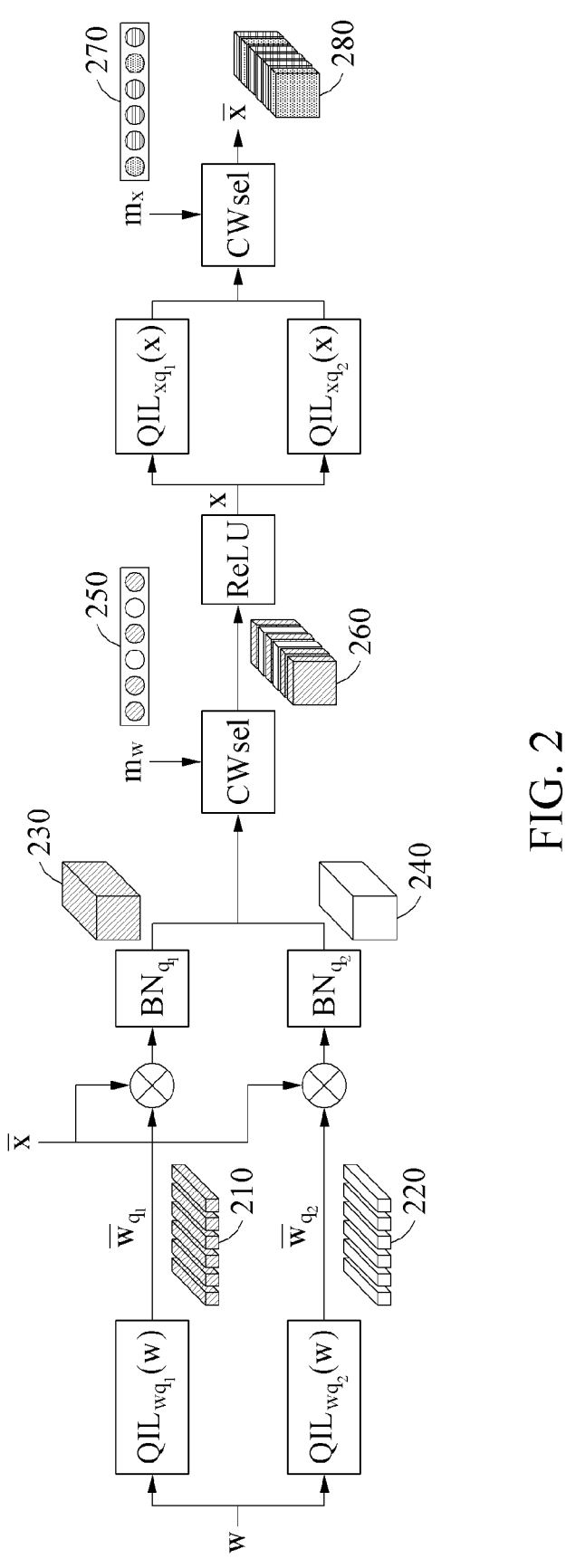
FIG. 2 illustrates an example of an operation of the neural network-based inference apparatus of FIG. 1.

FIG. 2 illustrates an example of an operation of the neural network-based inference apparatus of FIG. 1.

Referring to FIG. 2, the processor 200 may quantize a weight or an activation value using quantization levels, thereby efficiently performing inference of a neural network.

The processor 200 may assign relatively more bits to a layer or channel with relatively high significance and assign relatively fewer bits to a layer, channel, or weight (or weight filter) with relatively low significance, thereby securing a relatively high accuracy in inference while limiting resource usage.

In other words, the processor 200 may limitedly increase the number of bits (or the quantization level) only for a channel of a weight filter or activation value that greatly affects a loss, thereby maintaining the performance in quantization while minimizing an increase in the total number of bits.

The processor 200 may determine the significance of the layer, channel or weight filter to apply different quantization levels to several portions of the neural network. The processor 200 may determine a significance of a portion of the neural network based on a sensitivity indicating a deviation of weights or a deviation of outputs when the neural network is quantized.

The processor 200 may perform quantization for the weight filter and/or at a channel level, thereby providing finer granularity in the trade-off of accuracy and efficiency, compared to performing quantization at a layer level.

The processor 200 may compensate different distributions between different bit-widths for each bit-width, by including a batch normalization layer in the neural network.

In an example, the processor 200 may perform inference using a neural network having a multi-level quantizer that is trained together with the neural network, thereby preventing a solution of inference from being trapped in a local minimum due to an early decision of the bit-width.

The processor 200 may select an appropriate level of quantization for each weight filter or channel and perform inference, thereby securing the accuracy of the neural network while efficiently using hardware resources.

Further, the processor 200 may split the quantized filter or quantized activation value by an equal quantization level, thereby effectively performing the neural network operation and inference even when the existing computing system is used.

The processor 200 may quantize the weight. The quantization may be performed in various manners. In FIG. 2, w denotes a weight. In an example, the weight may be an implicit floating-point weight.

For example, the processor 200 may perform quantization using trainable quantizers having different ranges of quantization that depend on the quantization level.

The processor 200 may simultaneously train quantization parameters using back-propagation.

The processor 200 may obtain a first quantized weight 210 by quantizing the weight based on a first quantization level. The processor 200 may obtain a second quantized weight 220 by quantizing the weight based on a second quantization level.

The processor 200 may perform an operation with the activation value using the quantized weights 210 and 220. For example, the operation may include a convolution operation.

The processor 200 may generate a first channel 230 and a second channel 240 by performing batch normalization on each result of the convolution operation.

The processor 200 may select one of the first channel 230 and the second channel 240 channel based on a channel selection mask 250. The processor 200 may generate a first output 260 with different quantization levels for channels by continuing the selection motion for all channels included in the activation value.

In the example of FIG. 2, the channel selection mask 250 $m_w$, may have a value of "0" or "1" to select a channel quantized to one of two quantization levels.

Depending on an example, the value of the channel selection mask 250 may vary. The value of the channel selection mask 250 may increase according to the number of quantization levels used for quantization. For example, the value of the channel selection mask 250 may be "0" or "1." In another example, the value of the channel selection mask may be "2" if three types of quantization levels are used.

The processor 200 may input the first output 260 to a nonlinear activation function and then perform quantization and channel selection for the activation value. For example, the nonlinear activation function may include a rectified linear unit (ReLU).

The processor 200 may perform first quantization and second quantization on the first output 260 passing through the nonlinear activation function, and perform channel selection for the activation value using a channel selection mask 270.

In the example of FIG. 2, the channel selection mask 270 $m_x$ may have a value of "0" or "1". The processor 200 may obtain a second output 280 by performing channel selection for the first output 260 passing through the nonlinear activation function based on the channel selection mask 270.

The processor 200 may generate the channel selection masks 250 and 270. The process of generating the channel selection masks 250 and 270 will be described in detail with reference to FIG. 3.

The processor 200 may determine the weight, the quantization parameter, and the channel selection masks based on a loss of the neural network. The processor 200 may determine the weight, the quantization parameter, and the channel selection masks 250 and 270 using Equation 1.

$$(W^*, V^*, M^*) = \underset{W,V,M}{\text{argmin}} \mathcal{L}(f(D; W, V, M)) \qquad \text{[Equation 1]}$$

$$\text{s.t.} \ \ C(M) \leq r$$

In Equation 1, the weight may be W={w$^{(l)}$}l=1, . . . , L, the quantization parameter may be $$V = \left\{ v_q^{w(l)}, v_{qh}^{w(l)}, v_q^{x(l)}, v_{qh}^{x(l)} \right\}_{l=1,\dots,L},$$

and the channel selection masks 250 and 270 may be M={m$^{w(l)}$, m$^{x(l)}$}l=1, . . . , L.

Here, l denotes a layer index, and C(M)≤r may indicate a resource limitation. C(M) may denote a usage rate of a relatively high quantization level, and r may denote a threshold for the usage ratio.

In other words, the processor 200 may determine the weight, the quantization parameter, and the channel selection masks 250 and 270 that minimize a loss of the neural network for a provided dataset.

When a solution of Equation 1 is obtained at a time, the solution may be trapped in a local minimum. The processor 200 may reduce exploration for a network by performing training in a manner of enforcing the channel selection masks 250 and 270 provided at an early stage.

The processor 200 may determine a solution of Equation 1 in two steps. The first is training the neural network of FIG. 2 for random channel selection masks 250 and 270, and the second is estimating optimal channel selection masks 250 and 270 under the limitation of provided resources.

In an example, the processor 200 may train the neural network and estimate the channel selection masks 250 and 270 using two separate training datasets. One training dataset D$_{train}$ may be for training the neural network of FIG. 2, and the other training dataset D$_{valid}$ may be for estimating the channel selection masks 250 and 270.

The two steps described above may be expressed by Equation 2 and Equation 3.

$$(W^*, V^*) = \underset{W,V}{\text{argmin}} \mathcal{L}(f(D_{train}; W, V, M_{random})) \qquad \text{[Equation 2]}$$

$$(M^*) = \underset{M}{\text{argmin}} \mathcal{L}(f(D_{valid}; W^*, V^*, M)) \qquad \text{[Equation 3]}$$

In Equation 2, M$_{random}$ may denote the random channel selection masks 250 and 270 described above.

Referring to Equation 2, the processor 200 may train the neural network while randomly changing the channel selection masks 250 and 270 for each iteration while training the neural network.

Referring to Equation 3, the processor 200 may estimate the channel selection masks 250 and 270 by minimizing a loss of a validation set while fixing the weight and the quantization parameter to W* and V*.

In another example, to further increase the accuracy, the processor 200 may re-train the weight and quantization parameter V while fixing the channel selection masks 250 and 270 to M*.

The processor 200 may couple the channel selection masks 250 and 270 by setting the channel selection masks 250 and 270 identically, or decouple the channel selection masks 250 and 270 by setting the channel selection masks 250 and 270 differently.

The second output 280 may be used as an input of the next layer. Although a case of two quantization levels being provided has been described in the example of FIG. 2, three or more quantization levels may be provided depending on an example.

Figure 3:
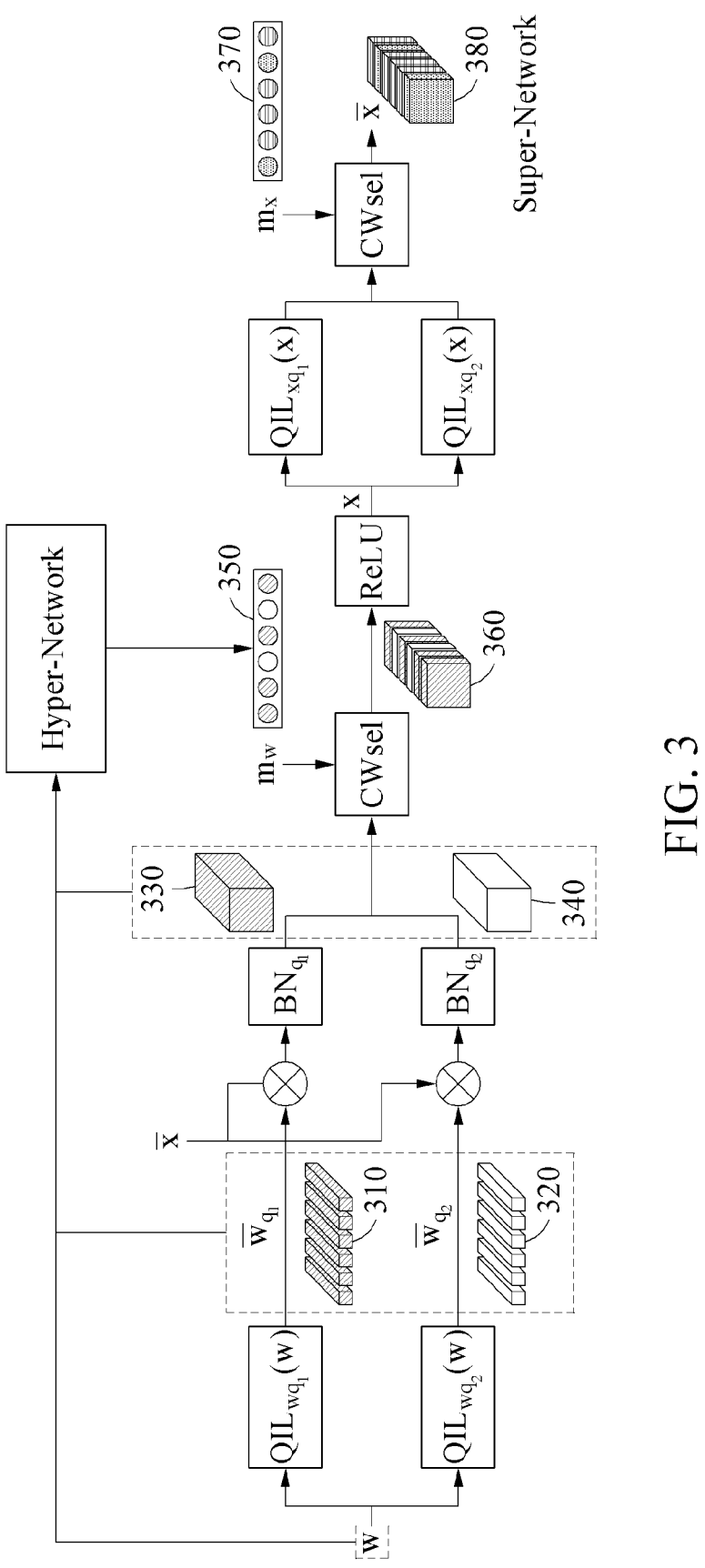
FIG. 3 illustrates an example of an operation of the neural network-based inference apparatus of FIG. 1.

FIG. 3 illustrates an example of an operation of the neural network-based inference apparatus of FIG. 1.

Referring to FIG. 3, the processor 200 may generate a first quantized weight 310 by performing a first quantization on a weight w, and generate a second quantized weight 320 by performing a second quantization on the weight w.

Thereafter, the processor 200 may generate a first channel 330 and a second channel 340 by performing a neural network operation (for example, a convolution operation) on an activation value and the quantized weights 310 and 320, as described in the example of FIG. 2.

The processor 200 may generate a first output 360 by selecting a channel quantized to one of two quantization levels using a channel selection mask 350, as described in the example of FIG. 2.

Further, the processor 200 may perform a first quantization and a second quantization by inputting the first output 360 to a nonlinear activation function (for example, ReLU) and generate a second output 380 by performing channel selection for the activation value using a channel selection mask 370, as described in the example of FIG. 2.

The processor 200 may optimize the channel selection masks 350 and 370 in various manners. For example, the processor 200 may optimize the channel selection masks 350 and 370 using one of the following four methods.

The first method may be a deviation-based method. The second method may be a sensitivity-based method. The third method may be a predictor-based search method, and the fourth method may be a direct loss minimization method.

The deviation-based method may use a deviation between an output and a quantizer (for example, mean squared error (MSE) or Kullback-Leibler (KL) divergence).

If a first quantization level has a higher value than a second quantization level, the first quantization level may deliver a relatively large amount of information. Therefore, the larger the deviation, the more the loss of information.

Thus, the processor 200 may assign a smaller quantization level (for example, the second quantization level) to a weight filter and/or channels having a relatively small deviation (for example, MSE or KL divergence), and assign a greater quantization level (for example, the first quantization level) to a weight filter and/or channels having a relatively large deviation.

The sensitivity-based method may obtain optimal channel selection masks 350 and 370 using a sensitivity. The sensitivity may be a deviation of losses with respect to a weight deviation or a deviation for the activation value. The processor 200 may measure the sensitivity by calculating second-order information such as Hessian.

The predictor-based method may generate 1K (mask, accuracy) samples by pushing random channel selection masks 350 and 370, for a provided neural network. Thereafter, the processor 200 may train a small predictor network including a multi-layer perceptron (MLP) including three layers.

The processor 200 may apply an evolutionary search to select channel selection masks 350 and 370 having the highest accuracy within a provided resource limitation.

The direct loss minimization method may directly train the channel selection masks 350 and 370 through back-propagation in a state in which the weight and the quantizer are fixed. The direct loss minimization method may directly reflect a task loss.

The processor 200 may select the channel selection masks 350 and 370 using a hyper-network, as shown in FIG. 3. To make the channel selection masks 350 and 370 trainable, the processor 200 may set an implicit floating-point parameter z for each element.

The processor 200 may apply a sigmoid function $\sigma(\bullet)$ to the parameter z, such that the range of the parameter may be between "0" and "1". A hard mask may be used to set a critical point of $\sigma(z)$ in a forward pass, and a soft mask may be used to update z in a backward pass. An L1 regularization may be used to satisfy the limitation of resources.

The processor 200 may randomly generate a mask for each iteration to perform training such that the performance of a partial network (or sub-network) of the entire neural network (or super-network of FIG. 3) may improve.

Figure 4:
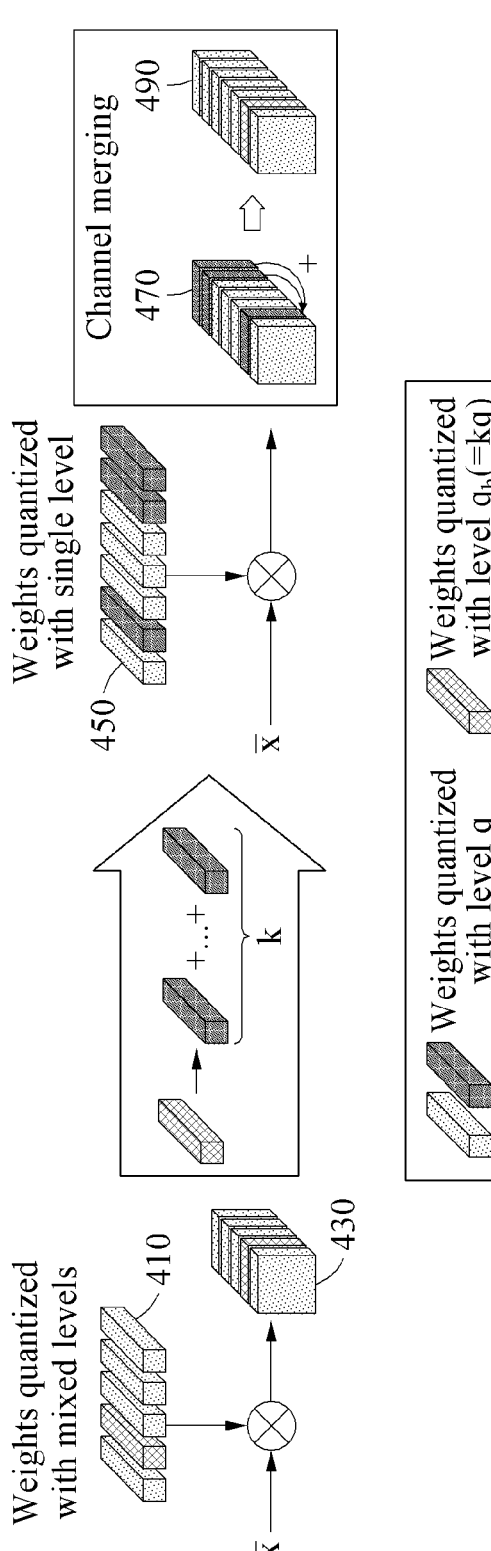
FIG. 4 illustrates an example of an operation of the neural network-based inference apparatus of FIG. 1.
Figure 5:
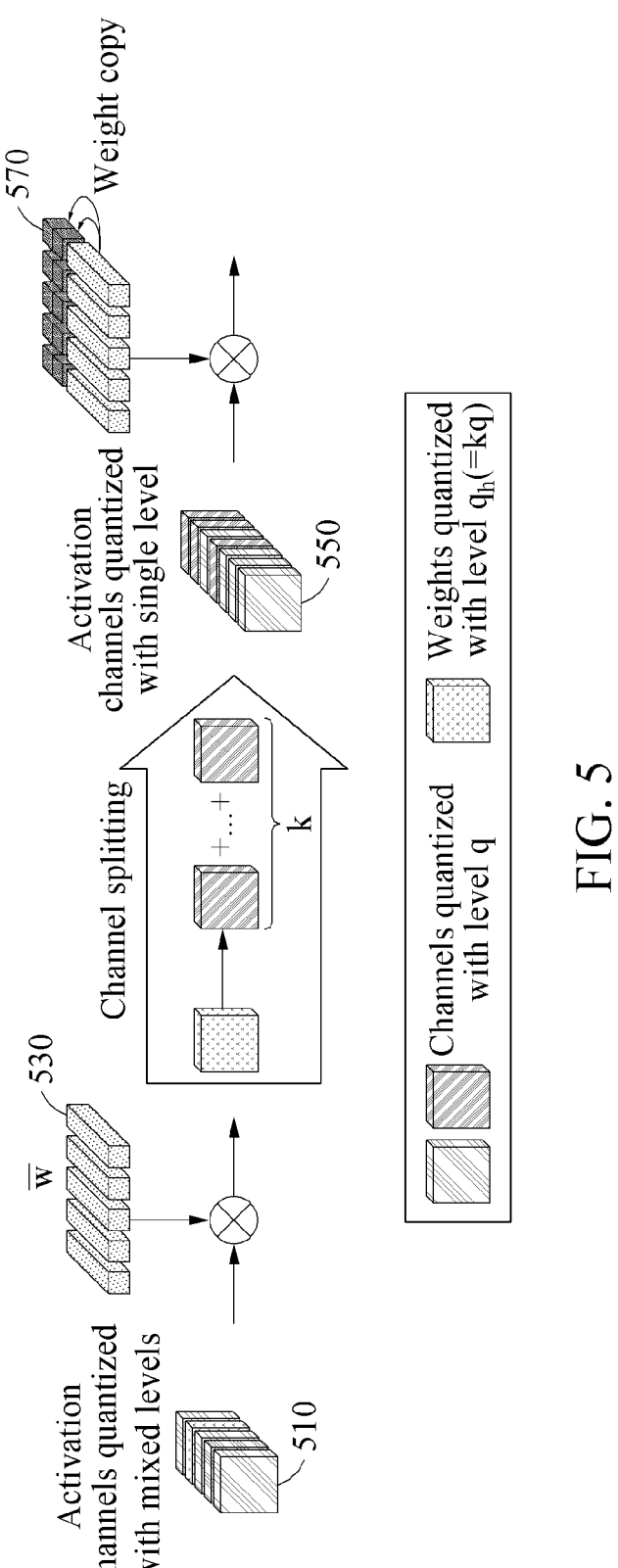
FIG. 5 illustrates an example of an operation of the neural network-based inference apparatus of FIG. 1.

FIG. 4 illustrates an example of an operation of the neural network-based inference apparatus of FIG. 1, and FIG. 5 illustrates another example of an operation of the neural network-based inference apparatus of FIG. 1.

Referring to FIGS. 4 and 5, the processor 200 may perform inference based on a quantization parameter, a quantized weight, and a quantized activation value. The processor 200 may find an optimal point in the trade-off between accuracy and efficiency of quantization by performing a channel-wise quantization of the weight filter and/or activation value.

The processor 200 may effectively perform inference in the existing computing systems through the splitting of the quantization parameter. The processor 200 may split a weight 410 and/or an activation value 510 corresponding to a relatively high quantization level into weights and/or activation values having a relatively low quantization level, thereby efficiently performing inference using limited resources.

For example, the processor 200 may generate split weights and/or activation values by splitting a first quantized weight and/or activation value. In this example, the split weights and/or activation values may be second quantized weights and/or activation values.

The processor 200 may split a weight 410 and/or channel 510 quantized with a relatively high quantization level, thereby performing only an operation for weights and/or channels having the same quantization level.

The processor 200 may assign a quantization level corresponding to an integer multiple of a second quantization level to a first quantization level, rather than assigning integer bits (for example, n bits if n is an integer) to the first quantization level.

For example, if the first quantization level is $q_h$ 430 and the second quantization level is q, the processor 200 may determine the first quantization level to satisfy $q_h = kq$ (k being an integer greater than or equal to "2").

If a target bit-width is 2 bits, the second quantization level q for the activation value may be $3(=2^2-1)$, and the first quantization level $q_h$ may be {6, 9, 12, . . . }.

The ratio of the first quantization level and the second quantization level may have a positive value other than an integer. For example, if $q_h$ is 7 and q is 3, the ratio of the first quantization level and the second quantization level may be 7/3=2.333 . . . . In this case, the processor 200 may represent $q_h$ with three quantization levels. When the ratio of the first quantization level and the second quantization level is an integer, training may be performed by maximizing the representation level of the first quantization level.

As shown in the example of FIG. 4, the processor 200 may split the weight (or weight filter). The processor 200 may split the weight as expressed by Equation 4 and perform an operation of the neural network.

$$\overline{w}_{q_h}^c * \overline{x} = (\overline{w}_q^{c1} + \overline{w}_q^{c2} + \ldots + \overline{w}_q^{ck}) * \overline{x} \qquad \text{[Equation 4]}$$

$$= \overline{w}_q^{c1} * \overline{x} + \overline{w}_q^{c2} * \overline{x} + \ldots + \overline{w}_q^{ck} * \overline{x}$$

$$= y^{c1} + y^{c2} + \ldots + y^{ck} = y^c$$

In Equation 4, $$\overline{w}_{q_h}^c$$

denotes the weight, and $\overline{x}$ denotes the activation value. In addition, $q_h = kq$ may be satisfied. In addition, c denotes the index of the weight (or weight filter).

The first row in Equation 4 may indicate the process of splitting the weight $$\overline{w}_{q_h}^c$$

quantized with the first quantization level $q_h$ with the second quantization level q.

The processor 200 may obtain channels $y^{c1}$, $y^{c2}$, . . . by performing the neural network operation (for example, convolution operation) with the activation value using the split weights.

Thereafter, the processor 200 may perform neural network inference by merging the split channels 470 to obtain a merged channel $y^c$ 490, to reconstruct the same result as before splitting.

The processor 200 may perform neural network inference by splitting the quantized activation value. The processor 200 may split an activation value quantized with a relatively high quantization level 510 into activation values of a smaller quantization level 550. For example, if the first quantization level $q_h$ is k times the second quantization level, in other words, $q_h = kq$ is satisfied, the processor 200 may split activation values quantized with the first quantization level $q_h$ into k activation values activated with the level q.

The processor 200 may copy the weight 570 for the neural network operation of the split activation values. The process of splitting the activation value by the processor 200 may be expressed by Equation 5.

$$\overline{w}^{c_{in}} * \overline{x}_{q_h}^c = \overline{w}^{c_{in}} * (\overline{x}_q^{c1} + \overline{x}_q^{c2} + \ldots + \overline{x}_q^{ck}) \qquad \text{[Equation 5]}$$

$$= \overline{w}^{c_{in}} * \overline{x}_q^{c1} + \overline{w}^{c_{in}} * \overline{x}_q^{c2} + \ldots + \overline{w}^{c_{in}} * \overline{x}_q^{ck}$$

In Equation 5, $$\overline{x}_{q_h}^c$$

denotes the activation value quantized with the first quantization level, and $$\overline{x}_q^{c1}, \overline{x}_q^{c2}, \ldots, \overline{x}_q^{ck}$$

denote the split activation values corresponding to the second quantization level. $\overline{w}^{c_{in}}$ denotes the weight. In this example, the weight may include the quantized weight or the split weights.

$c_{in}$ denotes the input channel index of a weight corresponding to a channel c of the activation value. Different distributions due to the quantization of different weights may be compensated using a separate batch normalization module. However, since there is no compensator between quantizers of activation values, the processor 200 may perform scaling so that the maximum quantized value is 1 for the quantizers of all the activation values. For scaling, the processor 200 may multiply the first quantization level $q_h$ by 1/k.

By reordering channels of the activation values, the processor 200 may multiply a convolution output corresponding to the first quantization level $q_h$ by 1/k only one time, before convolution outputs corresponding to the second quantization level q are accumulated.

In this manner, the processor 200 may equalize the quantization levels of activation values and weights of the entire model, rather than increasing the number of channels.

Figure 6:
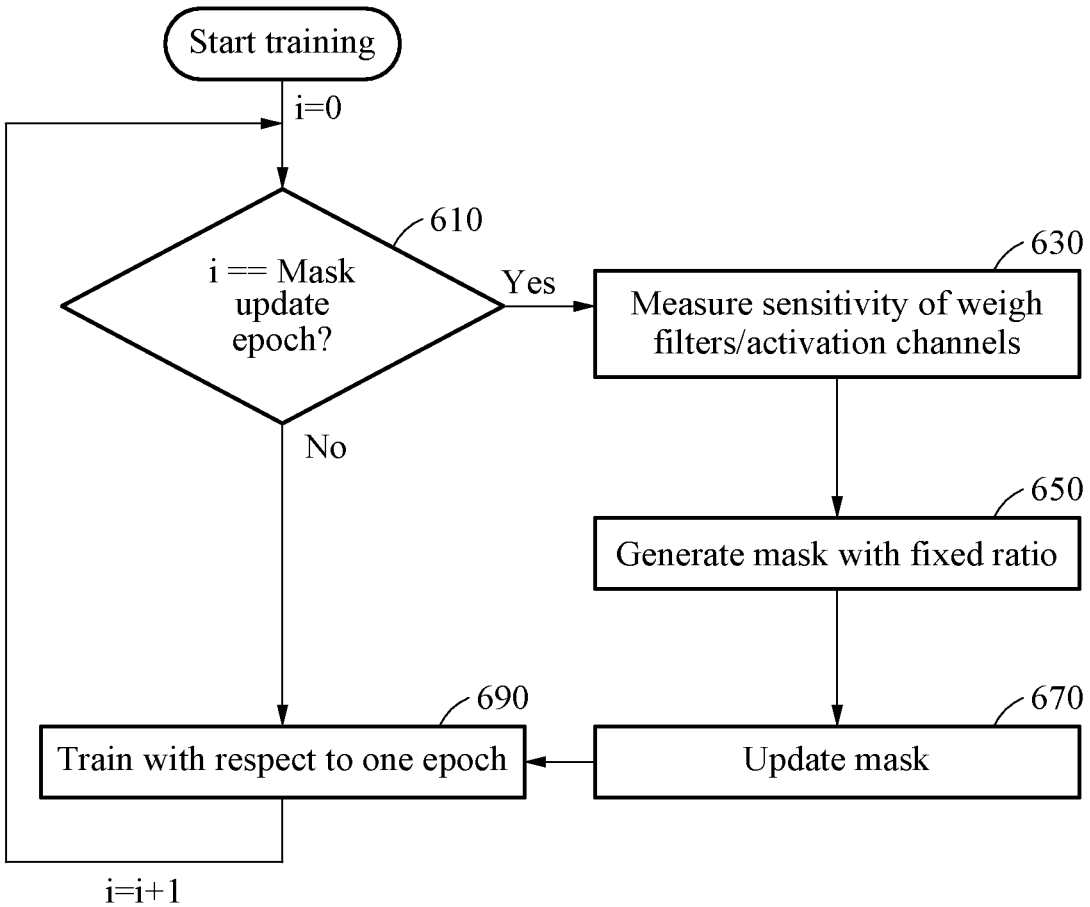
FIG. 6 illustrates an example of a training operation of the neural network-based inference apparatus of FIG. 1.

FIG. 6 illustrates an example of a training operation of the neural network-based inference apparatus of FIG. 1. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer, such as a processor, that perform the specified functions, or combinations of special purpose hardware and computer instructions. In addition to the description of FIG. 6 below, the descriptions of FIGS. 1-5 are also applicable to FIG. 6, and are incorporated herein by reference. Thus, the above description may not be repeated here.

Figure 7:
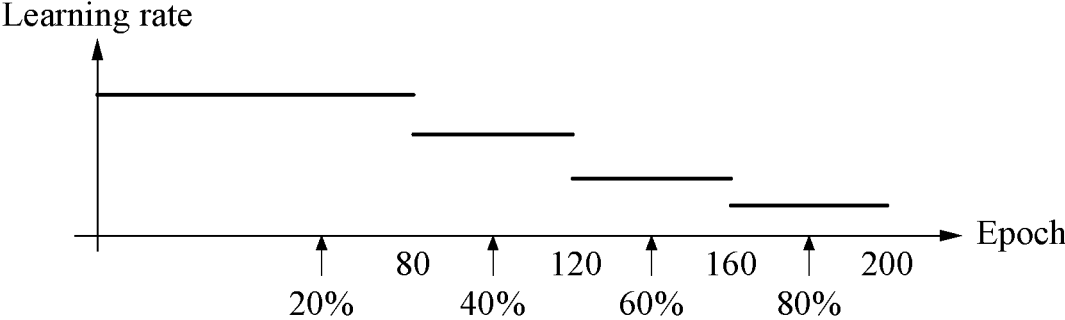
FIG. 7 illustrates an example of a learning rate in the training operation of FIG. 6.

FIG. 7 shows an example of a learning rate in the training operation of FIG. 6. Referring to FIGS. 6 and 7, the processor 200 may train a neural network while bits are restricted.

The processor 200 may configure a new neural network having multiple quantization levels by training the neural network while randomly generating the channel selection masks 350 and 370 and then by extracting partial networks of the entire neural network. However, the random masks may make it difficult to obtain optimized partial neural networks.

Thus, the processor 200 may train the neural network while measuring the sensitivity of the neural network during training and limiting the quantization level (or bits). FIG. 6 illustrates an example of this training method.

The processor 200 may sequentially fix weights or activation values with relatively small sensitivity to a change in quantization to a small number of bits, and train the neural network with a desired ratio. The sensitivity may be the same as that described with reference to FIG. 3.

In operation 610, the processor 200 may determine whether i is a mask update epoch. Thereafter, if i is a mask update epoch, the processor 200 may measure the sensitivity of weight filters (or weights) and/or channels of activation value, in operation 630.

In an example, the processor 200 may update a mask only in a mask update epoch. The mask update epoch may have a predetermined period or may be aperiodic. In an example, the mask update epoch may be determined by a user.

In operation 650, the processor 200 may generate the channel selection masks 350 and 370 with a fixed ratio. Thereafter, in operation 670, the processor 200 may update the generated channel selection masks 350 and 370.

In operation 690, the processor 200 may perform training with respect to one epoch. In an example, if i is not a mask update epoch, training may be performed immediately with respect to one epoch. After training is performed, the processor 200 may iteratively perform training by adding 1 to i.

The example of FIG. 7 shows a learning rate in a state in which 20%, 40%, 60%, or 80% of channels of an activation value are fixed to a predetermined quantization level at 60, 100, 140, or 180 epoch.

FIG. 8 illustrates an example of an operation of the neural network-based inference apparatus of FIG. 1. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently. One or more blocks of FIG. 8, and combinations of the blocks, can be implemented by special purpose hardware-based computer, such as a processor, that perform the specified functions, or combinations of special purpose hardware and computer instructions. In addition to the description of FIG. 8 below, the descriptions of FIGS. 1-7 are also applicable to FIG. 8, and are incorporated herein by reference. Thus, the above description may not be repeated here.

Referring to FIG. 8, the neural network-based inference apparatus 10 may perform inference based on a neural network. The neural network-based inference may include the process of receiving a quantization level and a quantized weight, quantizing an activation value, splitting the activation value, and performing inference based on the quantized weight and split activation values.

In operation 810, the receiver 100 may receive a quantization level for quantizing a weight of a neural network and an activation value that is processed by the neural network.

In operation 830, the receiver 100 may receive a weight quantized based on the quantization level. The quantized weight may include weights split based on the quantization level. In an example, the weight may be split in advance in the training process.

In operation 850, the processor 200 may generate a quantized activation value by quantizing the activation value based on the quantization level.

The processor 200 may obtain the split activation values by splitting the quantized activation value based on a ratio (hereinafter, referred to as the ratio) of a first quantization level included in the quantization level and a second quantization level included in the quantization level.

In operation 870, the processor 200 may perform inference based on the quantized weight and the quantized activation value.

The processor 200 may obtain the split activation values by splitting the quantized activation value based on the quantization level. The processor 200 may perform inference based on the quantized weight and the split activation values.

The processor 200 may obtain channels by performing an operation based on the split weights and the quantized activation value. The processor 200 may perform inference by merging the channels.

The processor 200 may perform inference by performing an operation based on the quantized weight and the split activation values. In an example, the quantized weight may be copied in advance and used for an operation with the split activation values. The quantized weight may be copied in advance in the training process.

Figure 9:
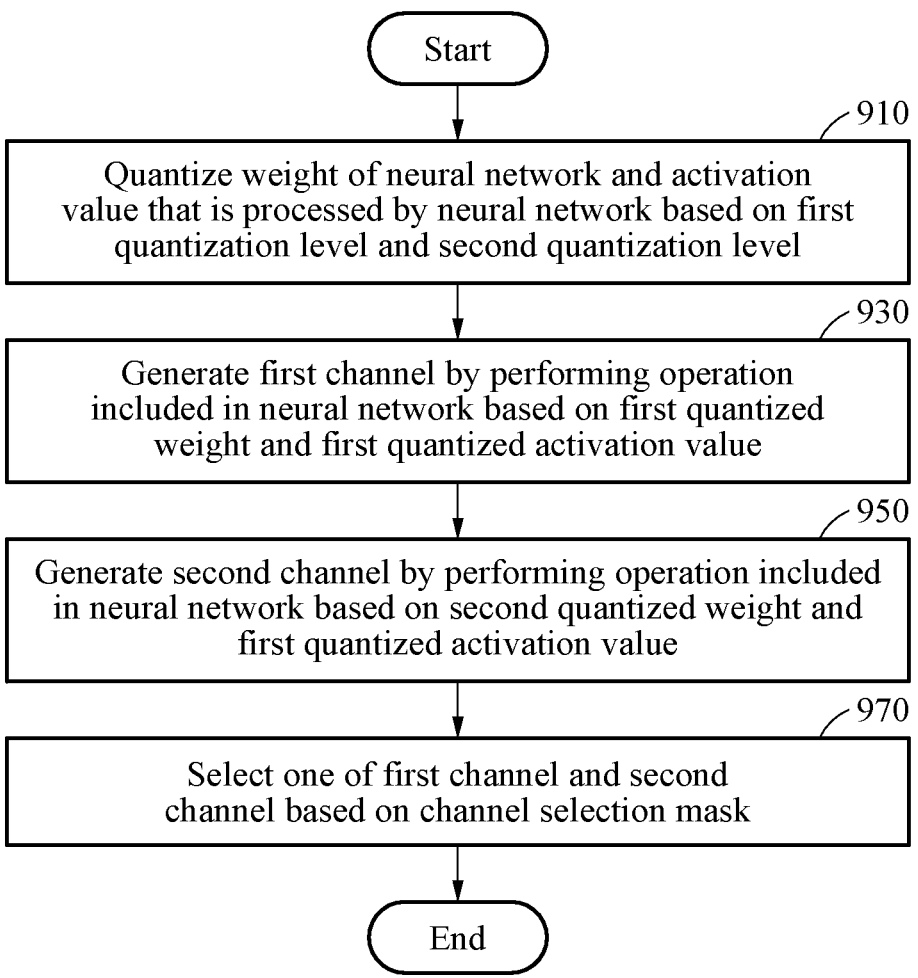
FIG. 9 illustrates an example of an operation of training a neural network.

FIG. 9 illustrates an example of an operation of training a neural network. The operations in FIG. 9 may be performed in the sequence and manner as shown, although the order of some operations may be changed or some of the operations omitted without departing from the spirit and scope of the illustrative examples described. Many of the operations shown in FIG. 9 may be performed in parallel or concurrently. One or more blocks of FIG. 9, and combinations of the blocks, can be implemented by special purpose hardware-based computer, such as a processor, that perform the specified functions, or combinations of special purpose hardware and computer instructions. In addition to the description of FIG. 8 below, the descriptions of FIGS. 1-8 are also applicable to FIG. 9, and are incorporated herein by reference. Thus, the above description may not be repeated here.

Referring to FIG. 9, the processor 200 may train a neural network. The training of the neural network may include the process of determining a quantization level, quantizing a weight based on the determined quantization level, and splitting the quantized weight. The training of the neural network may further include the process of training a mask to determine the quantization level.

The processor 200 may determine a first quantization level and a second quantization level based on a loss of the neural network. The processor 200 may determine the first quantization level based on the loss of the neural network, and determine the second quantization level based on the first quantization level. For example, the processor 200 may determine the first quantization level to be an integer multiple of the second quantization level.

In operation 910, the processor 200 may quantize a weight of the neural network and an activation value that is processed by the neural network based on the first quantization level and the second quantization level.

In operation 930, the processor 200 may generate a first channel by performing an operation included in the neural network based on a first quantized weight and a first quantized activation value.

In operation 950, the processor 200 may generate a second channel by performing an operation included in the neural network based on a second quantized weight and the first quantized activation value.

In operation 970, the processor 200 may select one of the first channel and the second channel based on a channel selection mask. The processor 200 may generate the channel selection mask, and select one of the first channel and the second channel based on the generated channel selection mask.

The processor 200 may generate the channel selection mask based on a deviation between a first output of the neural network based on the first quantization level and a second output of the neural network based on the second quantization level.

The processor 200 may generate the channel selection mask based on a sensitivity indicating a loss of the neural network for a deviation between a weight based on the first quantization level and a weight based on the second quantization level, or generate the channel selection mask based on a sensitivity indicating a loss of the neural network for a deviation between an activation value based on the first quantization level and an activation value based on the second quantization level.

Further, the processor 200 may train the channel selection mask based on the loss of the neural network.

The inference apparatus 10, and other apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the neural network-based inference method. In another example, the instructions or software include higher-level code that is executed by the processor or computer using an interpreter. The instructions or software may be written using any programming language based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD- ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A neural network-based inference method, comprising:
receiving a quantization level for quantizing a weight of a neural network and for quantizing an activation value that is processed by the neural network;
receiving a weight quantized based on the quantization level;
generating a quantized activation value by quantizing the activation value based on the quantization level; and
performing inference based on the quantized weight and the quantized activation value, including splitting the quantized activation value based on the quantization level to obtain split activation values and performing the inference based on the quantized weight and the split activation values.

2. The neural network-based inference method of claim 1, wherein the obtaining of the split activation values comprises obtaining the split activation values by splitting the quantized activation value based on a ratio of a first quantization level included in the quantization level and a second quantization level included in the quantization level.

3. The neural network-based inference method of claim 2, wherein the obtaining of the split activation values by splitting the quantized activation value based on the ratio of the first quantization level and the second quantization level comprises splitting the quantized activation value into a number of activation values corresponding to the ratio.

4. The neural network-based inference method of claim 2, wherein the ratio is an integer.

5. The neural network-based inference method of claim 1, wherein
the quantized weight comprises weights split based on the quantization level, and
the performing comprises:
obtaining channels by performing an operation based on the split weights and the quantized activation value; and
performing the inference by merging the channels.

6. A neural network-based inference apparatus, comprising:
a receiver processor configured to receive a quantization level for quantizing a weight of a neural network and for quantizing an activation value that is processed by the neural network, and to receive a weight quantized based on the quantization level; and
a processor configured to generate a quantized activation value by quantizing the activation value based on the quantization level, and to perform inference based on the quantized weight and the quantized activation value, including
splitting the quantized activation value based on the quantization level to obtain split activation values and performing the inference based on the quantized weight and the split activation values.

7. The neural network-based inference apparatus of claim 6, wherein the processor is further configured to obtain the split activation values by splitting the quantized activation value based on a ratio of a first quantization level included in the quantization level and a second quantization level included in the quantization level.

8. The neural network-based inference apparatus of claim 7, wherein the processor is further configured to obtain split the quantized activation value into a number of activation values corresponding to the ratio.

9. The neural network-based inference apparatus of claim 7, wherein the ratio is an integer.

10. The neural network-based inference apparatus of claim 6, wherein
the quantized weight comprises weights split based on the quantization level, and
the processor is further configured to obtain channels by performing an operation based on the split weights and the quantized activation value, and to perform the inference by merging the channels.

11. A neural network-based training method, comprising:
quantizing a weight of a neural network and quantizing an activation value that is processed by the neural network based on a first quantization level and a second quantization level;
generating a first channel by performing an operation included in the neural network based on a first quantized weight and a first quantized activation value;
generating a second channel by performing an operation included in the neural network based on a second quantized weight and the first quantized activation value; and
selecting one of the first channel and the second channel based on a channel selection mask.

12. The neural network-based training method of claim 11, further comprising:
determining the first quantization level and the second quantization level based on a loss of the neural network.

13. The neural network-based training method of claim 12, wherein the determining comprises:

determining the first quantization level based on the loss; and determining the second quantization level based on the first quantization level.

14. The neural network-based training method of claim 13, wherein the determining of the second quantization level based on the first quantization level comprises determining the first quantization level to be an integer multiple of the second quantization level.

15. The neural network-based training method of claim 11, wherein the selecting comprises:

generating the channel selection mask; and selecting one of the first channel and the second channel based on the channel selection mask.

16. The neural network-based training method of claim 15, wherein the generating of the channel selection mask comprises generating the channel selection mask based on a deviation between a first output of the neural network based on the first quantization level and a second output of the neural network based on the second quantization level.

17. The neural network-based training method of claim 15, wherein the generating of the channel selection mask comprises:

generating the channel selection mask based on a sensitivity indicating a loss of the neural network for a deviation between a weight based on the first quantization level and a weight based on the second quantization level; or generating the channel selection mask based on a sensitivity indicating a loss of the neural network for a deviation between an activation value based on the first quantization level and an activation value based on the second quantization level.

18. The neural network-based training method of claim 12, wherein the generating of the channel selection mask comprises training the channel selection mask based on the loss of the neural network.

* * * * *